US008477019B2

(12) United States Patent
Laroia et al.

(10) Patent No.: US 8,477,019 B2
(45) Date of Patent: Jul. 2, 2013

(54) METHODS AND APPARATUS FOR A UNIVERSAL DEVICE CONTROLLER USING PEER TO PEER COMMUNICATION

(75) Inventors: Rajiv Laroia, Far Hills, NJ (US); Junyi Li, Bedminster, NJ (US); Vincent D. Park, Budd Lake, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1111 days.

(21) Appl. No.: 12/370,119

(22) Filed: Feb. 12, 2009

(65) Prior Publication Data

US 2010/0201891 A1 Aug. 12, 2010

(51) Int. Cl.
*G05B 11/01* (2006.01)
*G08C 19/12* (2006.01)

(52) U.S. Cl.
USPC .................. 340/12.52; 340/12.54; 340/13.24; 340/13.25

(58) Field of Classification Search
USPC ...... 340/12.52, 12.54, 13.24, 13.25; 341/176; 345/168, 169; 370/338, 218, 328; 348/734
See application file for complete search history.

(56) References Cited

U.S. PATENT DOCUMENTS

| | | | | |
|---|---|---|---|---|
| 6,127,941 | A | 10/2000 | Van Ryzin | |
| 6,133,847 | A * | 10/2000 | Yang | 340/12.25 |
| 6,563,430 | B1 * | 5/2003 | Kemink et al. | 340/8.1 |
| 6,791,467 | B1 | 9/2004 | Ben-Ze'ev | |
| 7,064,675 | B2 * | 6/2006 | Zigmond et al. | 340/12.53 |
| 7,224,903 | B2 * | 5/2007 | Colmenarez et al. | 398/106 |
| 7,230,563 | B2 * | 6/2007 | Vidal | 341/176 |
| 7,493,651 | B2 * | 2/2009 | Vanska et al. | 726/2 |
| 7,649,456 | B2 * | 1/2010 | Wakefield et al. | 340/539.13 |
| 7,843,333 | B2 * | 11/2010 | Angelhag et al. | 340/539.13 |
| 8,054,211 | B2 * | 11/2011 | Vidal | 341/176 |
| 8,056,117 | B2 * | 11/2011 | Jung et al. | 726/2 |
| 8,059,621 | B2 * | 11/2011 | de Clerq et al. | 370/338 |
| 8,063,923 | B2 * | 11/2011 | Lilleness et al. | 715/738 |
| 2007/0176820 | A1 | 8/2007 | Vidal | |

FOREIGN PATENT DOCUMENTS

| | | | |
|---|---|---|---|
| JP | 7193878 | A | 7/1995 |
| JP | 2004242200 | A | 8/2004 |

OTHER PUBLICATIONS

International Search Report—PCT/US2010/024039, international Search Authority—European Patent Office—Apr. 13, 2010.
Written Opinion—PCT/US2010/024039—ISA/EPO—Apr. 13, 2010.
Taiwan Search Report—TW099104862—TIPO—Mar. 27, 2013.

* cited by examiner

*Primary Examiner* — Nam V Nguyen
(74) *Attorney, Agent, or Firm* — Paul S. Holdaway

(57) ABSTRACT

Methods and apparatus relating to wireless remote control are described. A communications device, such as a cell phone with peer to peer signaling capability, supports remote control functionality. The same communications device can be used as a universal wireless remote controller for a plurality of different remotely controllable devices including, e.g., a television, a DVD player, a light switch, a garage door opener, etc. The communications device monitors for and detects peer to peer signals from remotely controllable devices in its local vicinity. The communications device maintains a list of remotely controllable devices in its vicinity based on the detected peer to peer signals. The universal remote control user interface is configured in accordance with the maintained list. The universal remote controller provides a user interface which varies based on the device to be controlled.

19 Claims, 11 Drawing Sheets

| |
|---|
| FIGURE 2A |
| FIGURE 2B |

FIGURE 9

900

| DEVICE (902) | PEER DISCOVERY COMMUNICATED DEVICE IDENTIFIER (904) | REMOTE CONTROL INFO (908) | SOURCE OF RECEIVING REMOTE CONTROL INFO (910) |
|---|---|---|---|
| TV 1 | TV 1 ID | TV 1 REMOTE CONTROL INFO | PRELOADED IN REMOTE CONTROLLER |
| CABLE BOX | CABLE BOX ID | CABLE BOX REMOTE CONTROL INFO | DOWNLOADED THROUGH CELLULAR BASE STATION COUPLED TO CABLE PROVIDER SERVER VIA INTERNET |
| DVR | DVR ID | DVR REMOTE CONTROL INFO | DOWNLOADED THROUGH CELLULAR BASE STATION COUPLED TO THE DVR MANUFACTURER WEBSITE VIA INTERNET |
| ZONE 1 LIGHTING CONTROLLER | ZONE 1 LIGHTING CTRL. ID | ZONE 1 LIGHTING CONTROLLER REMOTE CONTROL INFO | RECEIVED VIA DIRECT PEER TO PEER SIGNALING |
| ZONE 1 TEMP CONTROLLER | ZONE 1 TEMP CTRL. ID | ZONE 1 TEMP CONTROLLER REMOTE CONTROL INFO | RECEIVED VIA REMOTE CONTROLLER INTERFACING WITH LOCAL PC ACCESSING REMOTE CONTROL INFORMATION FROM MANUFACTURER SUPPLIED MEDIA INCLUDING REMOTE CONTROL INFORMATION |
| SECURITY SYSTEM | SECURITY SYSTEM ID | SECURITY SYSTEM REMOTE CONTROL INFO | LOADED VIA INTERFACE OF REMOTE CONTROLLER WITH A MEMORY STORAGE DEVICE INCLUDING MANUFACTURER SUPPLIED REMOTE CONTROL INFORMATION |
| GARAGE DOOR OPENER | GARAGE DOOR OPENER ID | GARAGE DOOR OPENER REMOTE CONTROL INFO | RECEIVED VIA DIRECT PEER TO PEER SIGNALING |
| TV 2 | TV 2 ID | TV 2 REMOTE CONTROL INFO | COMBINATION PRELOADED IN REMOTE CONTROLLER / USER INPUT |
| WASHER/ DRYER | WASHER/DRYER CTRL. ID | WASHER/DRYER REMOTE CONTROL INFO | DOWNLOADED THROUGH A CELLULAR BASE STATION COUPLED TO WASHER/ DRYER MANUFACTURER WEBSITE VIA INTERNET |
| ZONE 2 TEMP CONTROLLER | ZONE 2 TEMP CTRL. ID | ZONE 1 TEMP CONTROLLER REMOTE CONTROL INFO | RECEIVED VIA DIRECT PEER TO PEER SIGNALING |
| ZONE 2 LIGHTING CONTROLLER | ZONE 2 LIGHTING CTRL. ID | ZONE 2 LIGHTING CONTROLLER REMOTE CONTROL INFO | RECEIVED VIA DIRECT PEER TO PEER SIGNALING |

STORED REMOTE CONTROL INFORMATION CORRESPONDING TO REMOTELY CONTROLLABLE DEVICES

METHODS AND APPARATUS FOR A UNIVERSAL DEVICE CONTROLLER USING PEER TO PEER COMMUNICATION

FIELD

Various embodiments relate to wireless communications, and more particularly, to methods and apparatus related to a universal device controller.

BACKGROUND

Manufactures have continued to embrace wireless remote control technology for controlling a wide range of devices. This has resulted in having to keep and maintain multiple physical remote control devices throughout the home, each corresponding to a different device. One problem resulting from this proliferation of individual device remote controllers is that a user may have to sift through an assortment of remote controllers to find the right one to match to the device desired to be controlled at a given time. This matching process can be annoying due to limited identification labeling on device controllers, similar or the same labeling on different device controllers, miniaturization of device controllers, small letter size on a device controller label, and/or poor lighting conditions. Another problem is that with so many device controllers in a home there is a tendency to misplace one or more remote controllers resulting in loss of remote control capability on the corresponding device. In addition an individual has to maintain each of the multiple remote control devices periodically replacing batteries. Based on the above discussion there it should be appreciated that there has been a need for a device, e.g., remote control, with the capability to remotely control a wide range of different devices.

Attempts at implementing multi-device remote controls have meet with limited success. A major drawback of many, so called universal remote controls, is the need for a user of the remote control to enter a code corresponding to each individual device which is to be controlled. This often involves the user determining a code to be entered from a printed look-up table. Unfortunately, the original instructions and look-up table information corresponding to a remote control are often lost or unavailable when a new device is purchased. Even more frustrating is the case where a new device does not correspond to a device code identifier supported by the universal remote control since the new device supports functions or features for which control commands did not exist at the time the universal remote control was manufactured.

In order to address the problem of having to enter a device code into a remote control to set it to work with a particular device, some manufactures have introduced a code search feature into their universal remote controls. In such a case the user may have to point the universal remote control at the device to be controlled, initiate a code search option and then wait for the device to respond, e.g., by turning on or off. Once a device responds, the user attempting to set the universal remote to control the device may push a button or take some other action to indicate to the device that the universal remote was able to control the device. Unfortunately, this approach has the disadvantage of requiring user input to indicate that the device responded to the control. It also has the disadvantage that the wrong device code may be selected since the device may respond to more than one power on signal code and, while the on/off device function may work, the device code identified in such a manner may not correspond to the full feature set supported by the device, e.g., the fast forward control might not work properly even though the on/off function works.

A successful implementation of a multi-device remote control is complicated by the fact that throughout a home there may be a very large number of individual devices, e.g., televisions, digital video recorders, alarm systems, etc. to be remotely controlled. A user may move a remote control from one room to another. Given that the devices in the different rooms may, and often are, different, a remote control manually configured to work with the devices in one room may not work with the devices, in the other room since the control commands for the devices may be different even in the case where the types of devices are the same, e.g., televisions in different rooms may require use of different command signals or codes.

Thus, it should be appreciated that it would be desirable if a remote control could be configured in an automated fashion without the need for a user to enter a device code or indicate a response from a device to be controlled. Furthermore it would be advantageous if a single device could remotely control any of a large number of devices, yet automatically adapt its user interface to the current local device environment. It would also be desirable, if a remote control could be automatically updated, e.g., to allow for the generation of new command signals and/or the control of new devices with functions which may not have been present in devices at the time the remote control was originally manufactured.

In view of the above discussion it should be appreciated that there is a need for an improved remote control which overcomes one or more of the above discussed disadvantages of exiting remote control devices.

SUMMARY

Methods and apparatus relating to wireless remote control are described. In some embodiments, a communications device, e.g., a cell phone with peer to peer signaling capability, supports universal remote control functionality. The communications device can be used as a universal wireless remote controller for a plurality of other remotely controllable devices including, e.g., a television, a DVD player, a light switch, a garage door opener, etc. while avoiding one or more of the problems discussed above of known multi-device remote controls. In accordance with one aspect, a universal remote controller provides a user interface which automatically varies based on the device to be controlled.

In some embodiments, the exemplary communications device, e.g., wireless remote control, monitors for and detects peer to peer signals from remotely controllable devices. The signals for which the communications device monitors may be, e.g., discovery signals from a controllable device communicating a device identifier. In some such embodiments, the communications device, e.g., wireless universal remote control device, maintains a list of remotely controllable devices in its vicinity based on detected peer to peer signals. The maintained list may be updated at different times to reflect the controllable devices in the remote controls vicinity at a given time. In various embodiments, the universal remote controller user interface is configured in accordance with the maintained list. In this manner, the list of controllable device may be automatically updated to reflect changes in the vicinity of the remote control device due to movement of the remote control from one location to another or changes due to the introduction or removal of devices from a location, e.g., room.

An exemplary method of operating a communications device, in accordance with some embodiments, comprises: receiving a wireless signal from a remotely controllable device; adding said remotely controllable device to a list of controllable devices in wireless communications range of said communications device; and enabling control of the remotely controllable device via a user interface on the communications device. An exemplary communications device, in accordance with some embodiments, comprises: at least one processor configured to: receive a wireless signal from a remotely controllable device; add said remotely controllable device to a list of controllable devices in wireless communications range of said communications device; and enable control of the remotely controllable device via a user interface on the communications device. The exemplary communications device further comprises memory coupled to said at least one processor.

In accordance with some aspects of some embodiments the remote control device is preprogrammed with a set of control signal information and device identifiers. Upon receiving a device identifier the remote control device can retrieve the corresponding control signal information from memory if it is already stored therein. In cases where the control signal information is not already stored, the control device may retrieve the control signal information for a discovered device from a remote location via, e.g., a network connection. In accordance with another aspect, devices which can be controlled may communicate control information to the remote control device in addition to the peer discovery signal identifying the device. For example, when a device which can be controlled is manufactured, or at some point thereafter, it can be programmed with a device identifier corresponding to the device and a set of control information indicating which signals are to be generated to control various functions of the device. In this manner, a device which can be controlled may communicate not only a device identifier but the very control signal and/or other information required by the remote control device to control the controllable device. Thus, a remote control can be automatically updated with the command set, signal generation information, and/or function information required to control a new device even if the functions were not available or in existence at the time the remote control device was manufactured. Furthermore, for one or more remotely controllable devices, the remote control device can be automatically configured with the command set which specifically matches a particular device to be controlled without the need for user input from a user of the remote control device, e.g., with the device to be controlled providing the required control information via a wireless communications link in some embodiments.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 9 is a table of exemplary stored remote control information corresponding to remotely controllable devices.

DETAILED DESCRIPTION

Figure 1:
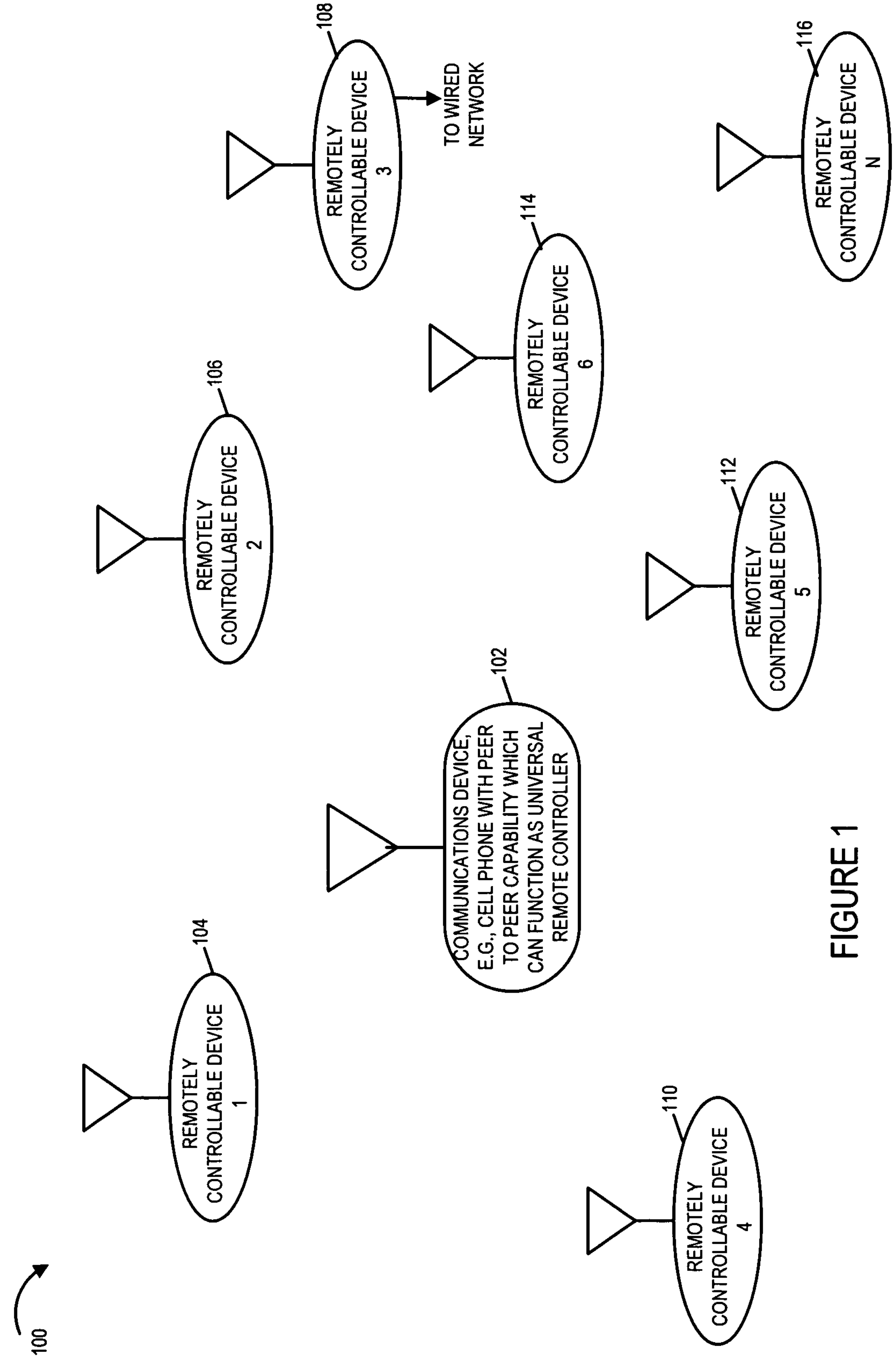
FIG. 1 is a drawing of an exemplary wireless communications system including a communications device, e.g., a cell phone with universal wireless remote controller capability, and a plurality of remotely controllable devices.

FIG. 1 is a drawing of an exemplary wireless communications system 100 including a communications device 102 and a plurality of remotely controllable devices (remotely controllable device 1 104, remotely controllable device 2 106, remotely controllable device 3 108, remotely controllable device 4 110, remotely controllable device 5 112, remotely controllable device 6 114, . . . , remotely controllable device N 116). Communications device 102 is, e.g., a cell phone with peer to peer capability which can function as a universal remote controller. The remotely controllable devices (104, 106, 108, 110, 112, 114, . . . , 116) have wireless communications capability, e.g., peer to peer capability, and can be controlled remotely, e.g., by communications device 102. Some examples of remotely controllable devices include: television, DVD player, digital recorder, cable box, stereo system, radio, IPOD, MP3 device, MP4 device, landline phone, answering machine, fiber to the home interface, light controller, temperature controller, airflow controller, intercom device, security device, door opener, car starter, GPS system, alarm system, washer/dryer, range/oven, microwave, refrigerator, adjustable chair, shades/blinds, exercise machine, etc.

Figure 2A:
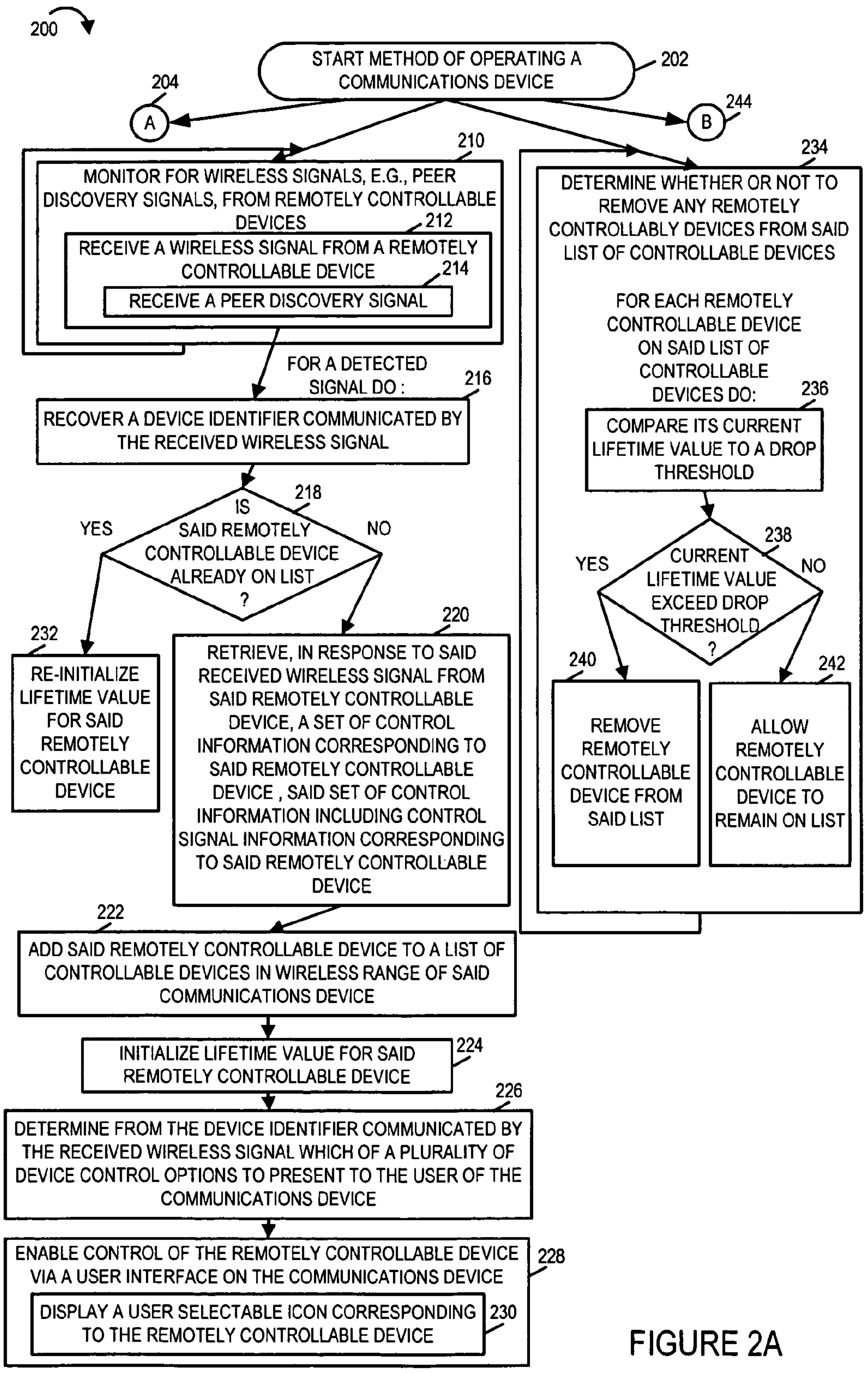
FIG. 2A is a first part of a flowchart of an exemplary method of operating a wireless communications device functioning as a universal remote controller in accordance with an exemplary embodiment.
Figures 2, 2B:
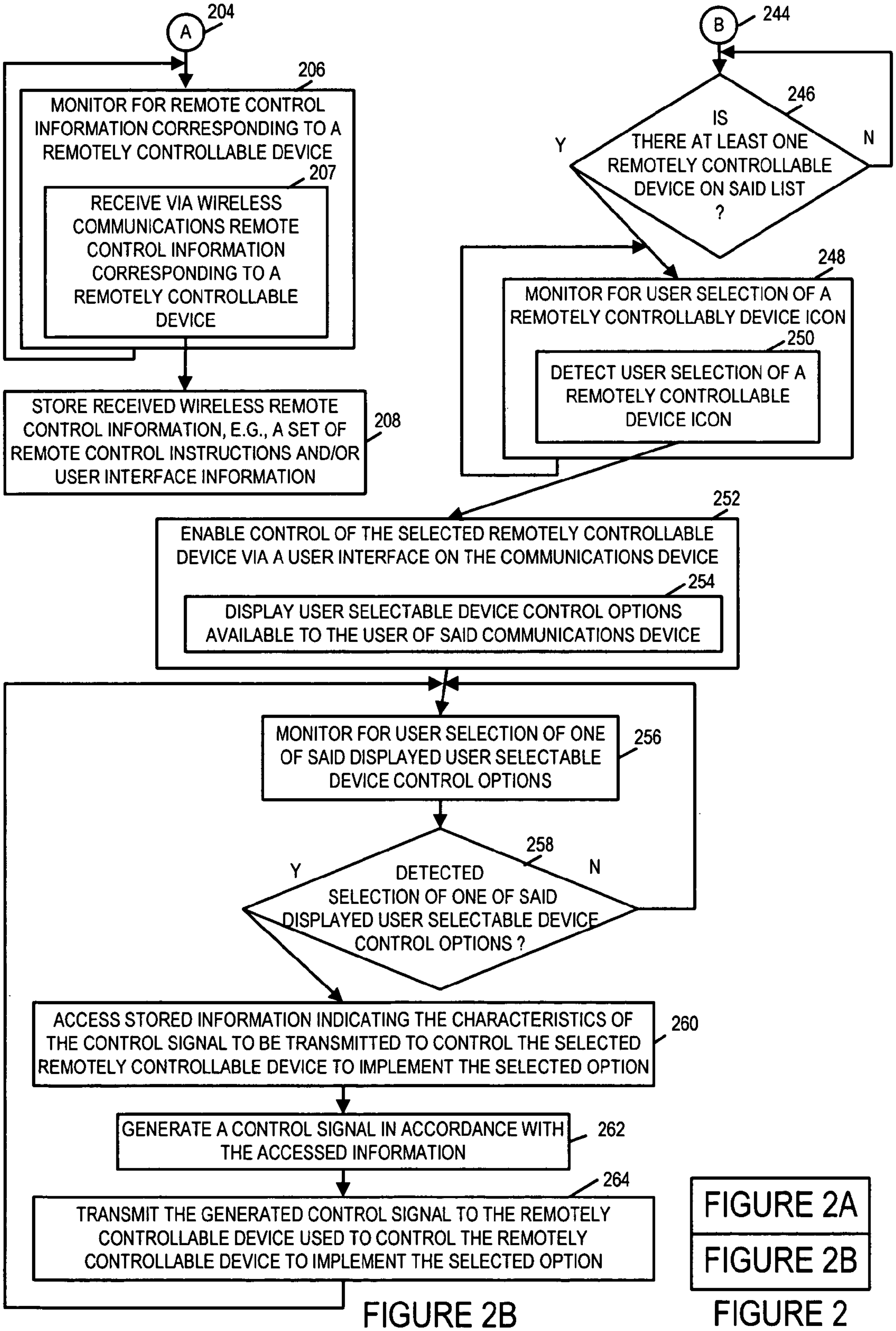
FIG. 2B is a second part of a flowchart of an exemplary method of operating a wireless communications device functioning as a universal remote controller in accordance with an exemplary embodiment.

FIG. 2, comprising the combination of FIG. 2A and FIG. 2B, is a flowchart 200 of an exemplary method of operating a communications device in accordance with an exemplary embodiment. The exemplary communications device is, e.g., exemplary communications device 102 of system 100 of FIG. 1. Operation starts in step 202 where the communications device, e.g., a cell phone with peer to peer communications capability which can function as a universal remote controller, is powered on and initialized. Operation proceeds from start step 202 to step 206 via connecting node A 204, to step 210, to step 234 and to step 246 via connecting node B 244.

In step 206, which is performed on a recurring basis, the communications device monitors for remote control information corresponding to a remotely controlled device. Step 206 includes step 207. In step 207, the communications device receives, via wireless communications, remote control information corresponding to a remotely controlled device. In response to reception in step 207, operation proceeds from step 207 to step 208. In step 208 the communications device stores the received wireless terminal remote control information, e.g., a set of remote control instructions and/or user interface information.

Returning to step 210, in step 210, which is performed on a recurring basis, the communications device monitors for wireless signals, e.g., peer discovery signals, from remotely controllable devices. Step 210 includes step 212. In step 212 the communications device receives a wireless signal from a remotely controllable device. Step 212 includes step 214, in which the communications device receives a peer discovery signal. For a detected signal of step 212, operation proceeds from step 212 to step 216. In step 216 the communications device recovers a device identifier communicated from the received wireless signal of step 212. Operation proceeds from step 216 to step 218.

In step 218 the communications device determines whether or not the remotely controllable device corresponding to the received signal of step 212 is already on a list of remotely controllable devices in wireless range of said communications device. If the remotely controllable device is not on the list, then operation proceeds from step 218 to step 220. However, if the remotely controllable device is already on the list, then operation proceeds from step 218 to step 232.

Returning to step 220, in step 220 the communications device retrieves, in response to the received wireless signal from said remotely controllable device, a set of control information corresponding to the remotely controllable device, said set of control information including control signal information corresponding to said remotely controllable device. The retrieved set of control information can be retrieved from previously stored information being stored on the communications device or can be fetched at this time, e.g., via peer to peer signaling or through a cellular communications link including a base station. Operation proceeds from step 220 to step 222. In step 222 the communications device adds said remotely controllable device to a list of controllable devices in wireless range of said communications device, and in step 224 the communications device initializes a lifetime value for said remotely controllable device.

Operation proceeds from step 224 to step 226. In step 226 the communications device determines from the device identifier communicated by the received wireless signal which of a plurality of device control options to present to the user of the communications device. Operation proceeds from step 226 to step 228. In step 228 the communications device enables control of the remotely controllable device via a user interface on the communications device. Step 228 includes step 230, in which the communications device displays a user selectable icon corresponding to the remotely controllable device. Returning to step 232, in step 232 the communications device re-initializes a lifetime value for said remotely controllable device.

Returning to step 234, in step 234, which is performed on a recurring basis, the communications device determines whether or not to remove any remotely controllable devices from the list of controllable devices. Step 234 includes steps 236, 238, 240 and 242. Step 236, step 238 and one of steps 240 and 242 is performed for each remotely controllable device on the list of controllable devices in wireless range of the communications device. In step 236, the communications device compares its current lifetime value associated with remotely controllable device on the list under consideration for removal with a drop threshold. Operation proceeds from step 236 to step 238. In step 238 if the communications device determines that the current lifetime value exceeds the drop threshold, then operation proceeds from step 238 to step 240, where the communications device removes the remotely controllable device from the list. Alternatively, in step 238 if the communications device determines that the current lifetime value does not exceed the drop threshold, then operation proceeds from step 238 to step 242, where the communications device is controlled to allow the remotely controllable device to remain on the list.

Returning to step 246, in step 246 the communications device checks as to whether there is at least one remotely controllable device on its list of controllable devices in range of the wireless communications device. If there is not at least one device on its list, then operation returns to the input of step 246 for another test at a later time. However, if in step 246 the communications device determines that there is at least one remotely controllable device on its list, then operation proceeds from step 246 to step 248.

In step 248, which is performed on an ongoing basis, the communications device monitors for user selection of a remotely controllable icon. Step 248 includes step 250, in which the communications device detects user selection of a remotely controllable device icon. In response to the detected user selection of the icon, operation proceeds from step 250 to step 252. In step 252 the communications device enables control of the selected remotely controllable device via a user interface on the communications device. Step 252 includes step 254 in which the communications device displays user selectable device control options available to the user of said communications device.

Operation proceeds from step 252 to step 256, in which the communications device monitors for user selection of one of said displayed user selectable device control options. Operation proceeds from step 256 to step 258. In step 258 the communications devices checks if the monitoring of step 256 has detected selection of one of the said displayed user selectable device control options. If the monitoring of step 256 has not detected a user selection, then operation proceeds from step 258 to the input of step 256 for additional monitoring. However, if the monitoring of step 256 has detected a user selection, then operation proceeds from step 258 to step 260. In step 260 the communications device accesses stored information indicating the characteristics of the control signal to be transmitted to control the selected remotely controllable device to implement the selected control operation. Operation proceeds from step 260 to step 262 in which the communications device generates a control signal in accordance with accessed information of step 260. Then, in step 264 the communications device transmits the generated control signal to the remotely controllable device used to control the remotely controllable device to implement the selected option. Operation proceeds from step 264 to the input of step 256.

Figure 3:
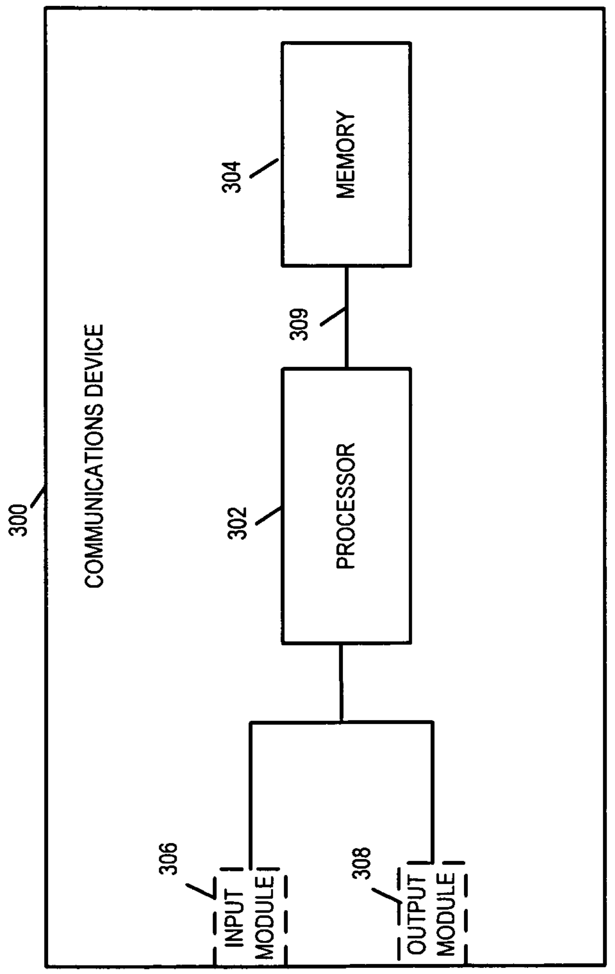
FIG. 3 is a drawing of an exemplary communications device in accordance with an exemplary embodiment.

FIG. 3 is a drawing of an exemplary communications device 300, in accordance with an exemplary embodiment. Exemplary communications device 300 implements a method in accordance with flowchart 200 of FIG. 2. Exemplary communications device 300 is, e.g., communications device 102 of FIG. 1. Communications device 300 is, e.g., a cell phone with peer to peer communications capability which can function as a universal remote controller, Communications device 300 includes a processor 302 and memory 304 coupled together via a bus 309 over which the various elements (302, 304) may interchange data and information. Communications device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output.

Processor 302 is configured to: receive a wireless signal from a remotely controllable device; add said remotely controllable device to a list of controllable devices in wireless communications range of said communications device; and enable control of the remotely controllable device via a user interface on the communications device. Processor 302 is further configured to: transmit a control signal to the remotely controllable device, in response to receiving user input.

Processor 302, in some embodiments, is configured to receive a peer discovery signal as part of being configured to receive a wireless signal from a remotely controllable device. In various embodiments, processor 302 is configured to display user selectable device control options available to the user of said communications device as part of being configured to enable control of the remotely controllable device.

Processor 302 is further configured to: monitor for user selection of one of said displayed user selectable device control options; and in response to detecting selection of one of said displayed user selectable device control options, transmit a signal to said remotely controllable device used to control the remotely controllable device to implement the selected option.

Processor 302 is further configured to: access stored information indicating the characteristics of the control signal to be transmitted to control the remotely controllable device to implement the selected option. Processor 302 is configured to display a user selectable icon corresponding to the remotely controllable device as part of being configured to enable control of the remotely controllable device.

Processor 302 is further configured to retrieve, in response to said received wireless signal from a remotely controllable device, a set of control information corresponding to said remotely controllable device, said set of control information including control signal information corresponding to said remotely controllable device; and determine from a device identifier communicated by said received wireless signal which of a plurality of device control options to present to the user of the communications device.

Communications device 300 may, and sometimes does include a set of pre-programmed control information with device identifiers. In some cases, where control information corresponding to a detected remotely controllable device is not already stored, communications device 300 can retrieve the corresponding control signal information from a remote location, e.g., via a network connection. In some cases, where control information corresponding to a detected remotely controllable device is not already stored, communications device 300 can retrieve the corresponding control information directly from the remotely controllable device, e.g., via direct peer to peer signaling. In this manner, a device which can be controlled may communicate not only a device identifier but the very control signal information and/or other information required by the remote control device 300 to control the controllable device. In various embodiments, for at least some remotely controllable devices, communications device 300 can be automatically configured with the command set which specifically matches a particular device to be controlled without the need for user input from a user of the remote control device 300, e.g., with the device to be controlled providing the required control information via a wireless communications link in some embodiments. Communications device 300 can be automatically updated, e.g., to allow for the generation of new command signals and/or the control of new devices with functions which may not have been present in devices in the time the remote control 300 was originally manufactured.

Figure 4A:
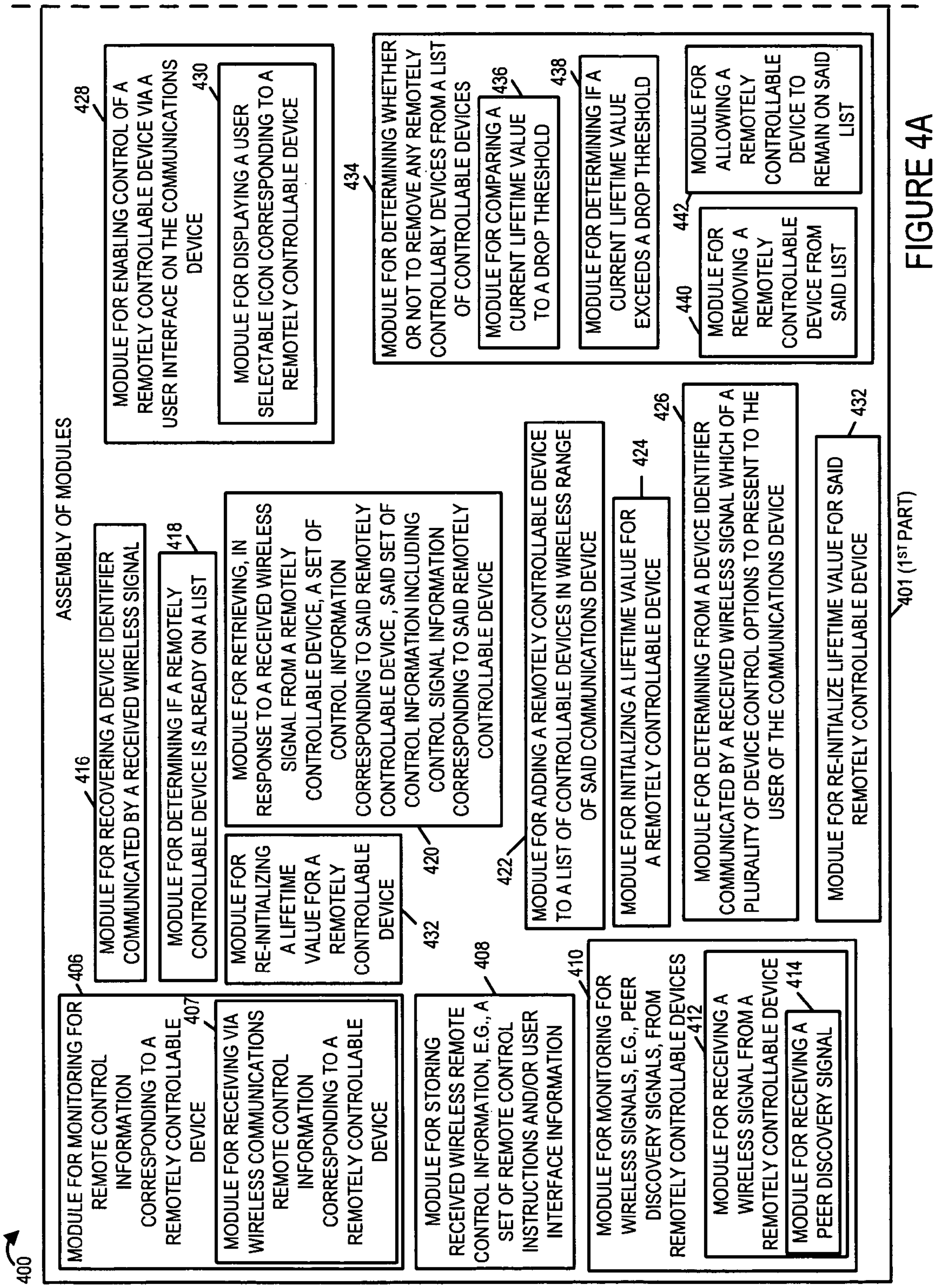
FIG. 4A is a first portion of an assembly of modules which can, and in some embodiments are, used in the communications device illustrated in FIG. 3.
Figure 4B:
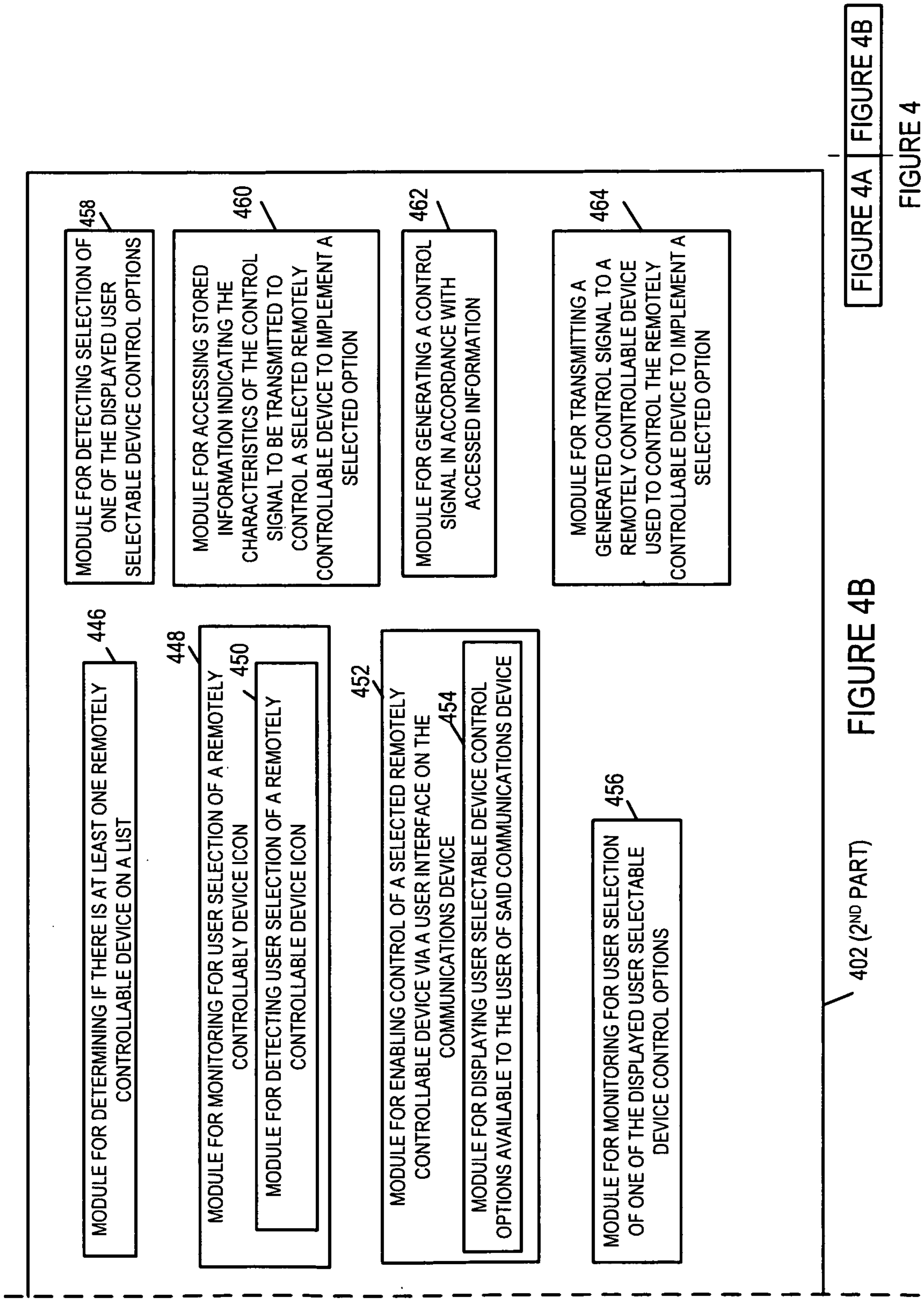
FIG. 4B is a second portion of an assembly of modules which can, and in some embodiments are, used in the communications device illustrated in FIG. 3.

FIG. 4, comprising the combination of FIG. 4A and FIG. 4B, is an assembly of modules 400 which can, and in some embodiments are, used in the communications device 300 illustrated in FIG. 3. FIG. 4A illustrates a first part 401 of assembly of modules 400, while FIG. 4B illustrates a second part 402 of assembly of modules 400. The modules in the assembly 400 can be implemented in hardware within the processor 302 of FIG. 3, e.g., as individual circuits. Alternatively, the modules may be implemented in software and stored in the memory 304 of the communications device 300 shown in FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of module 400. In embodiments where the assembly of modules 400 is stored in the memory 304, the memory 304 is a computer program product comprising a computer readable medium comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the communications device 300 or elements therein such as the processor 302, to perform the functions of the corresponding steps illustrated in the method flowchart 200 of FIG. 2.

As illustrated in FIG. 4, the assembly of modules 400 includes: a module 406 for monitoring for remote control information corresponding to a remotely controllable device and a module 408 for storing received wireless remote control information, e.g., a set of remote control instructions and/or user interface information. Module 406 includes a module 407 for receiving, via wireless communications, remote control information corresponding to a remotely controllable device.

Assembly of modules 400 further includes a module 410 for monitoring for wireless signals, e.g., peer discovery signals, from remotely controllable devices, a module 416 for recovering a device identifier communicated by a received wireless signal, a module 418 for determining if a remotely controllable device is already on a list, a module 420 for retrieving, in response to a received wireless signal from a remotely controllable device, a set of control information corresponding to said remotely controllable device, said set of control information including control signal information corresponding to said remotely controllable device, a module

422 for adding a remotely controllable device to a list of controllable devices in wireless range of said communications device, a module 424 for initializing a lifetime value for a remotely controllable device, a module 426 for determining from a device identifier communicated by a received wireless signal which of a plurality of device control options to present to the user of the communications device, a module 428 for enabling control of a remotely controllable device via a user interface on the communications device, and a module 432 for re-initializing a lifetime value for a remotely controllable device. Module 410 includes a module 412 for receiving a wireless signal from a remotely controllable device. Module 412 includes a module 414 for receiving a peer discovery signal. Module 428 includes a module 430 for displaying a user selectable icon corresponding to a remotely controllable device.

Assembly of modules 400 further includes a module 434 for determining whether or not to remove any remotely controllable devices from a list of controllable devices. Module 434 includes a module 436 for comparing a current lifetime value to a drop threshold, a module 438 for determining if a current lifetime value exceeds a drop threshold, a module 440 for removing a remotely controllable device from said list and a module 442 for allowing a remotely controllable device to remain on said list.

A module 446 for determining if there is at least one remotely controllable device on a list, a module 448 for monitoring for user selection of a remotely controllable device icon, a module 452 for enabling control of a selected remotely controllable device via a user interface on the communications device, a module 456 for monitoring for user selection of one of the displayed user selectable device control options, a module 458 for detecting selection of one of the displayed user selectable device control options, a module 460 for accessing stored information indicating the characteristics of the control signal to be transmitted to control a selected remotely controllable device to implement a selected option, a module 462 for generating a control signal in accordance with accessed information, and a module 464 for transmitting a generated control signal to a remotely controllable device used to control the remotely controllable device to implement a selected option. Module 448 includes a module 450 for detecting user selection of a remotely controllable device icon. Module 452 includes a module 454 for displaying user selectable device control options available to the user of the communications device.

Figure 5:
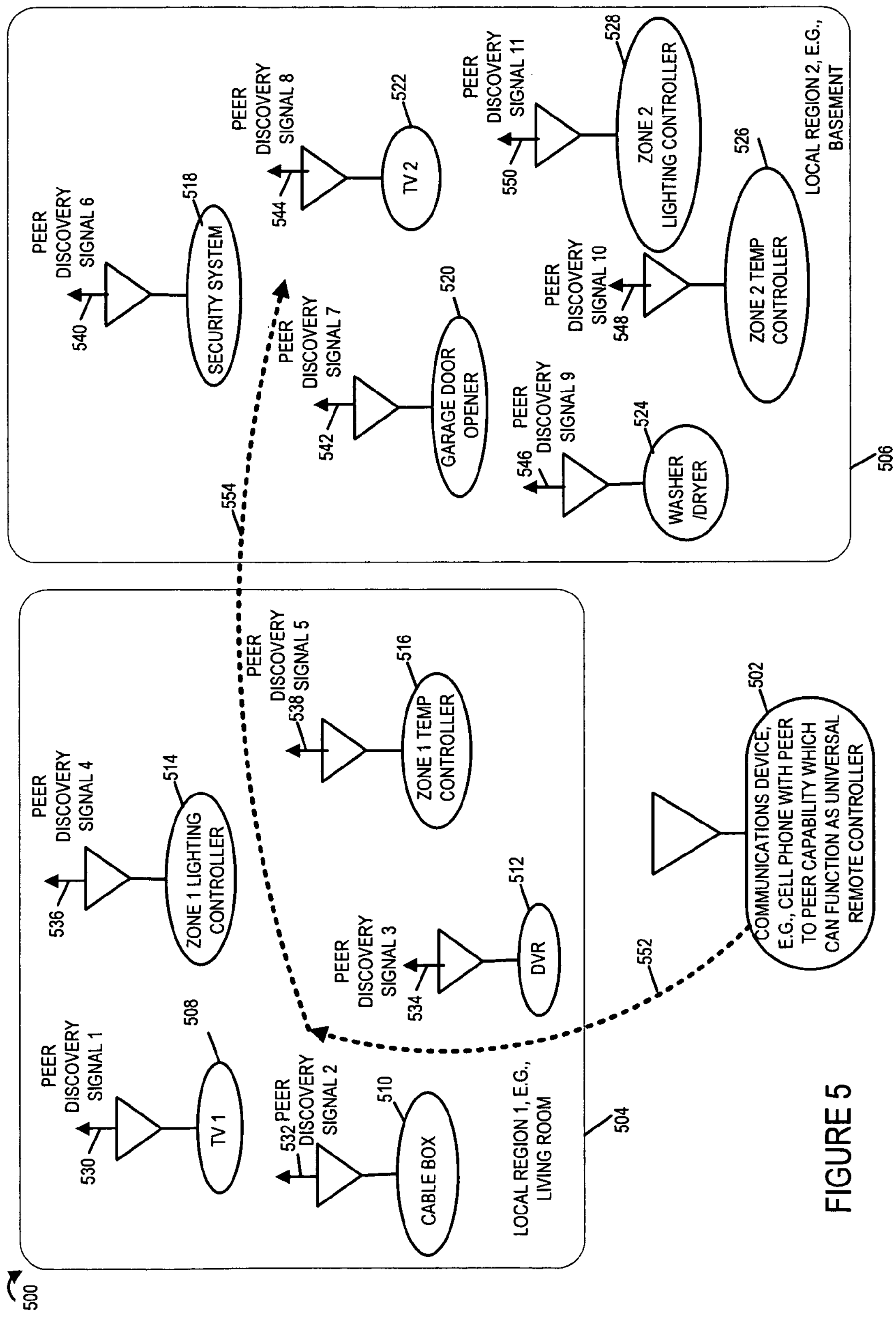
FIG. 5 is a drawing illustrating an exemplary wireless communications system including a communications device, e.g., a cell phone with universal remote control capability, and a plurality of remotely controllable devices.

FIG. 5 is a drawing illustrating an exemplary wireless communications system 500 including communications device 502 and a plurality of remotely controllable devices (television (TV) 1 508, cable box 510, digital video recorder (DVR) 512, zone 1 lighting controller 514, zone 1 temperature controller 516, security system 518, garage door opener 520, TV 2 522, washer/dryer 524, zone 2 temperature controller 526 and zone 2 lighting controller 528. Communications device 502 is, e.g., a cell phone with peer to peer capability which can function as a universal remote controller. The remotely controllable devices (508, 510, 512, 514, 516, 518, 520, 522, 524, 526, 528) also support peer to peer communications. Communications device 502 may be communications device 102 of FIG. 1; and the remotely controllable devices ((508, 510, 512, 514, 516, 518, 520, 522, 524, 526, 528) of FIG. 5 may be any of the remotely controllable devices of FIG. 1.

Local area 1 504, e.g., a living room, includes TV 1 508, cable box 510, DVR 512, zone 1 lighting controller 514, and zone 1 temperature controller 516. Local area 2 506, e.g., a basement, includes security system 518, garage door opener 520, TV 2 522, washer/dryer 524, zone 2 temperature controller 526 and zone 2 lighting controller 528.

Communications device 502 functions as a universal remote controller for any of the remotely controllable devices (508, 510, 512, 514, 516, 518, 520, 522, 524, 526, 528). The remotely controllable devices (508, 510, 512, 514, 516, 518, 520, 522, 524, 526, 528) transmit peer discovery signals (peer discovery signal 1 530, peer discovery signal 2 532, peer discovery signal 3 534, peer discovery signal 4 536, peer discovery signal 5 538, peer discovery signal 6 540, peer discovery signal 7 542, peer discovery signal 8 544, peer discovery signal 9 546, peer discovery signal 10 548, peer discovery signal 11 550), respectively. In different locations communications device 502 may detect different peer discovery signals. Communications device 502 generates and maintains a list of remotely controllable devices in its wireless range, e.g., based upon detected peer discovery signals. Communications device 502 may move throughout the system, adding and/or deleting devices from its list. For example communications device 502 moves into local region 1 504 as indicated by dashed arrow 552, detects peer discovery signals (530, 532, 534, 536, and 538) and adds remotely controllable devices (508, 510, 512, 514, and 516) to its list. Subsequently, communications device 502 moves out of local region 1 504 as indicated by dashed arrow 554, ceases to detect peer discovery signals (530, 532, 534, 536, and 538) and deletes remotely controllable devices (508, 510, 512, 514, and 516) from its list. Arrow 554 also indicates that communications device 502 enters local region 2 506. In local region 2 506 communications device 502 detects peer discovery signals (540, 542, 544, 546, 548, and 550) and adds remotely controllable devices (518, 520, 522, 524, 526, and 528) to its list. Although shown in this example as two distinctly separated regions in which the communications device operates, in general there may be, and sometimes is, overlap between various regions at a site. In general, the communications device 502 maintains a list of remotely controllable devices in its current local vicinity, and the local vicinity region associated with the list follows the motion of communications device 502. In some embodiments, with regard to the list of remotely controllable devices, in addition to using proximity as a criteria for inclusion on the list, the communications device 502 also uses pre-existing relationship information as a criteria for inclusion. For example, a remotely controllable device with which communications device 502 has a pre-existing relationship may be included on the list, but a remotely controllable device with which communications device 502 does not have a pre-existing relationship is excluded.

Communications device 502 retrieves in response to a received peer discovery signal from a remotely controllable device a set of control information corresponding to the remotely controllable device. Control information includes, e.g., a set of remote control instructions, user interface information, and/or remote control signal characteristic information. The control information can be retrieved from previously stored information. For example, the control information may have been preloaded in the communications device or may have been stored in the communications device as part of an initialization process. Alternatively, the control information can be retrieved directly from the remotely controllable device via direct peer to peer signaling or the control information can be retrieved via another interface, e.g., a cellular link to a base station and/or the Internet, following detection of the received peer discovery signal.

Communications device 502 enables control of remotely controllable devices on its list of controllable devices in wireless range, e.g., displaying icons corresponding to the devices on its lists and/or displaying user selectable device control options corresponding to devices on its list. Thus the user interface of the communications device 502, which is functioning as a universal remote controller, is configured to match the devices currently on its list of controllable devices in its wireless range. Control signals which are generated and transmitted by communications device 502 are also customized to match the particular characteristics of the selected device which is being controlled.

Figure 6:
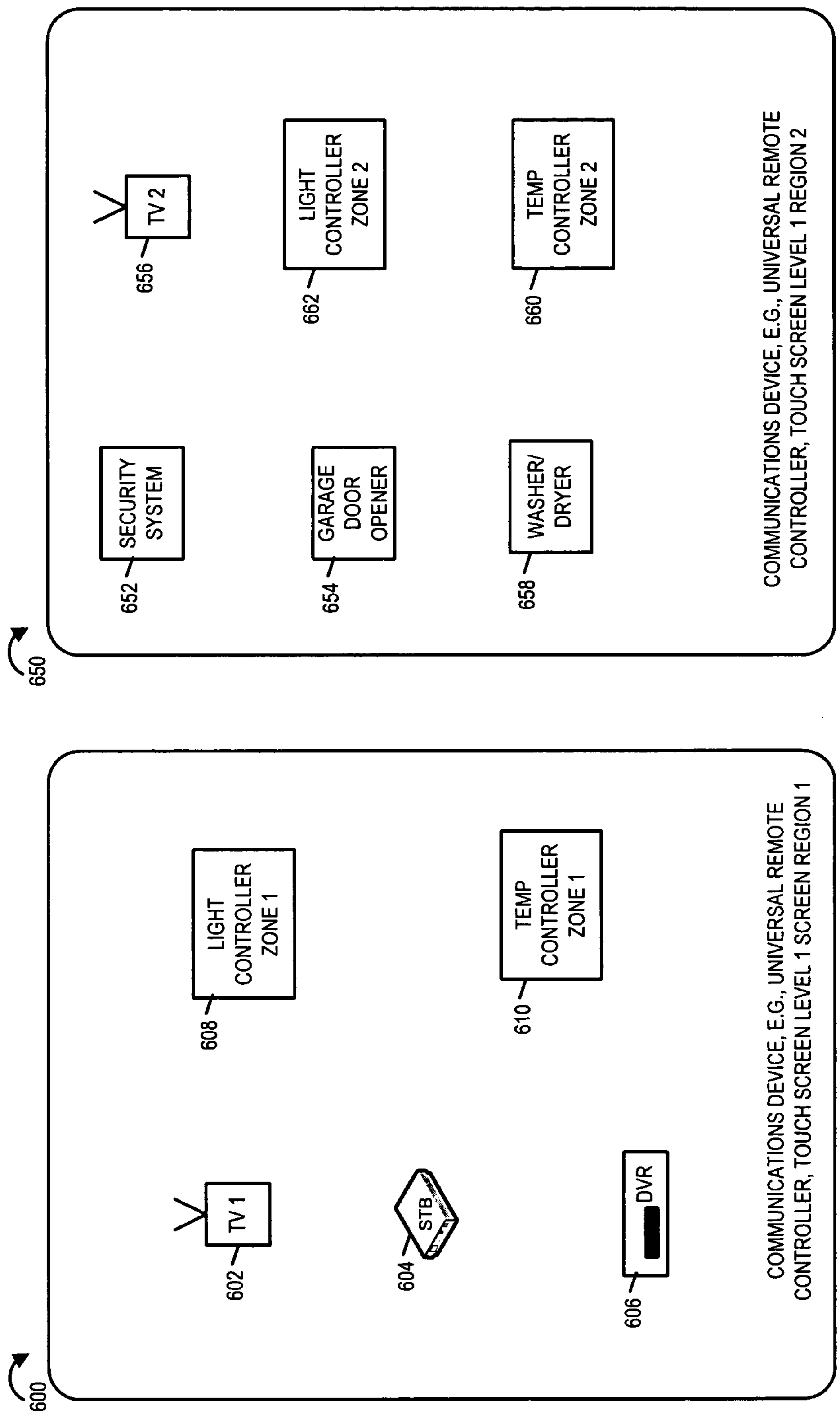
FIG. 6 illustrates two exemplary screens which may appear on the exemplary communications device of FIG. 5 at different times based on received peer discovery signals from remotely controllable devices.

FIG. 6 illustrates two exemplary screens which may appear on exemplary communications device 502 of FIG. 5, e.g., a universal remote controller, at different times based on received peer discovery signals from remotely controllable devices. In this example, the screen on communications device 502 is a touch screen. However, in other embodiments, different user interfaces are possible for communications device 502 including, e.g., switches, buttons, keys, etc.

Drawing 600 is an exemplary level 1 screen displayed on communications device 502 in local region 1 504 after achieving steady state conditions. The exemplary screen display of drawing 600 includes a user selectable icon corresponding to each of the remotely controllable devices that communications device 502 has detected and deemed to be in its wireless range. More specifically, there are icons (602, 604, 606, 608, 610) corresponding to devices (508, 510, 512, 514, 516), respectively.

Drawing 650 is an exemplary level 1 screen displayed on communications device 502 in local region 2 506 after achieving steady state conditions. The exemplary screen display of drawing 650 includes a user selectable icon corresponding to each of the remotely controllable devices that communications device 502 has detected and deemed to be in its wireless range. More specifically, there are icons (652, 654, 656, 658, 660, 662) corresponding to devices (518, 520, 522, 524, 526, 528), respectively.

Figure 7:
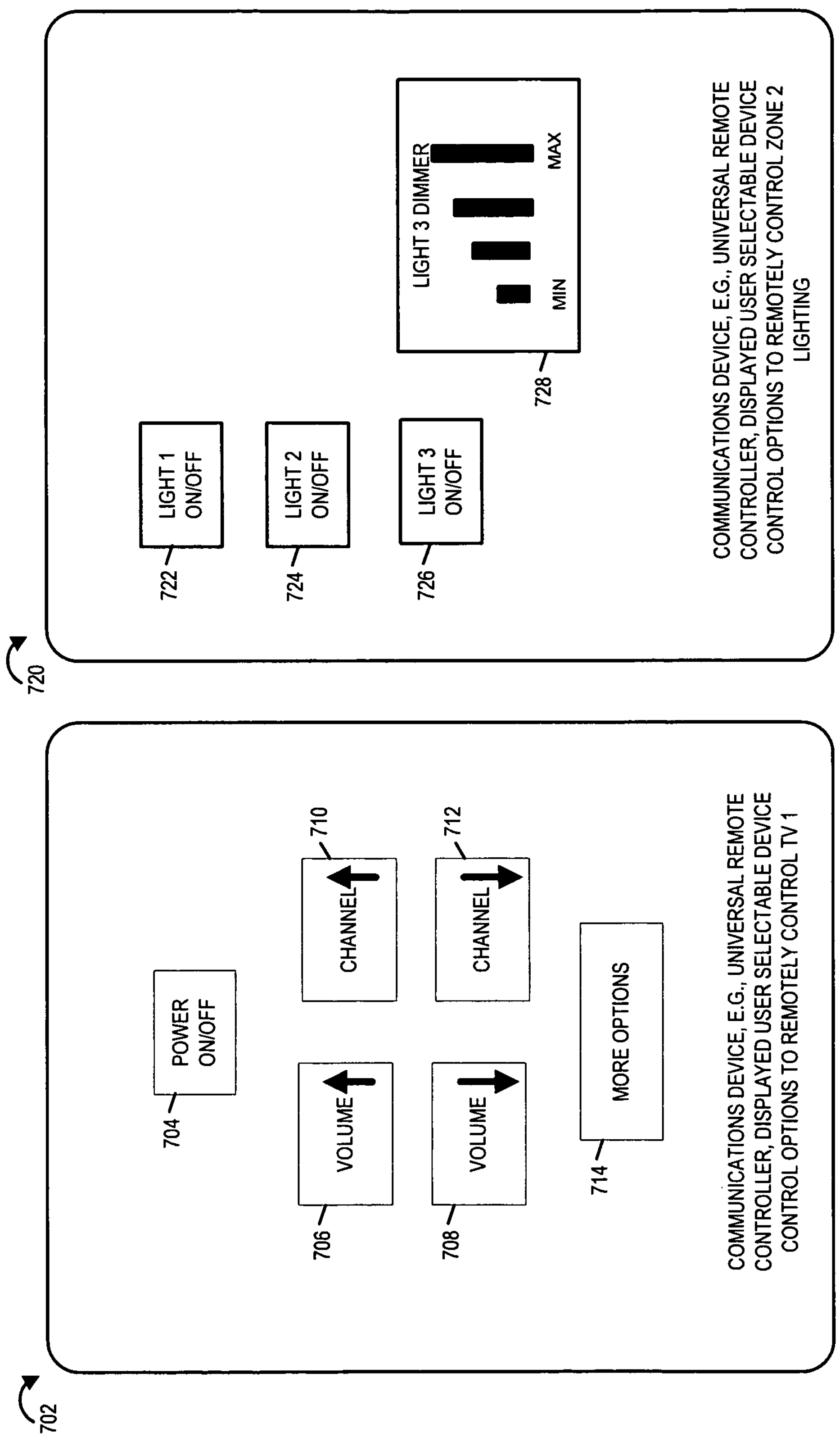
FIG. 7 illustrates two exemplary screens illustrating different user selectable device control options that may be displayed on the exemplary communications device of FIG. 5 corresponding to user selection of different displayed device icons.

FIG. 7 illustrates two exemplary screens that may be displayed on communications device 502, e.g., a universal remote controller, corresponding to user selection of different displayed icons. Drawing 702 illustrates an exemplary screen displayed in response to selection of TV 1 icon 602 of FIG. 6. Drawing 702 illustrates a display of user selectable device control options to remotely control TV 1 508 of FIG. 5. More specifically display 702 includes a power on/off touch screen button 704, an UP volume control touch screen button 706, a down volume touch screen button 708, an UP channel selection touch screen button 710, a down channel selection touch screen button 712, and a more options touch screen button 714.

Drawing 720 illustrates an exemplary screen displayed in response to selection of light controller zone 2 icon 662 of FIG. 6. Drawing 720 illustrates a display of user selectable device control options to remotely control zone 2 light controller 528 of FIG. 5. More specifically display 720 includes a light 1 on/off touch screen button 722, a light 2 on/off touch screen button 724, a light 3 on/off touch screen button 726 and a light 3 dimmer control touch screen area 728.

Figure 8:
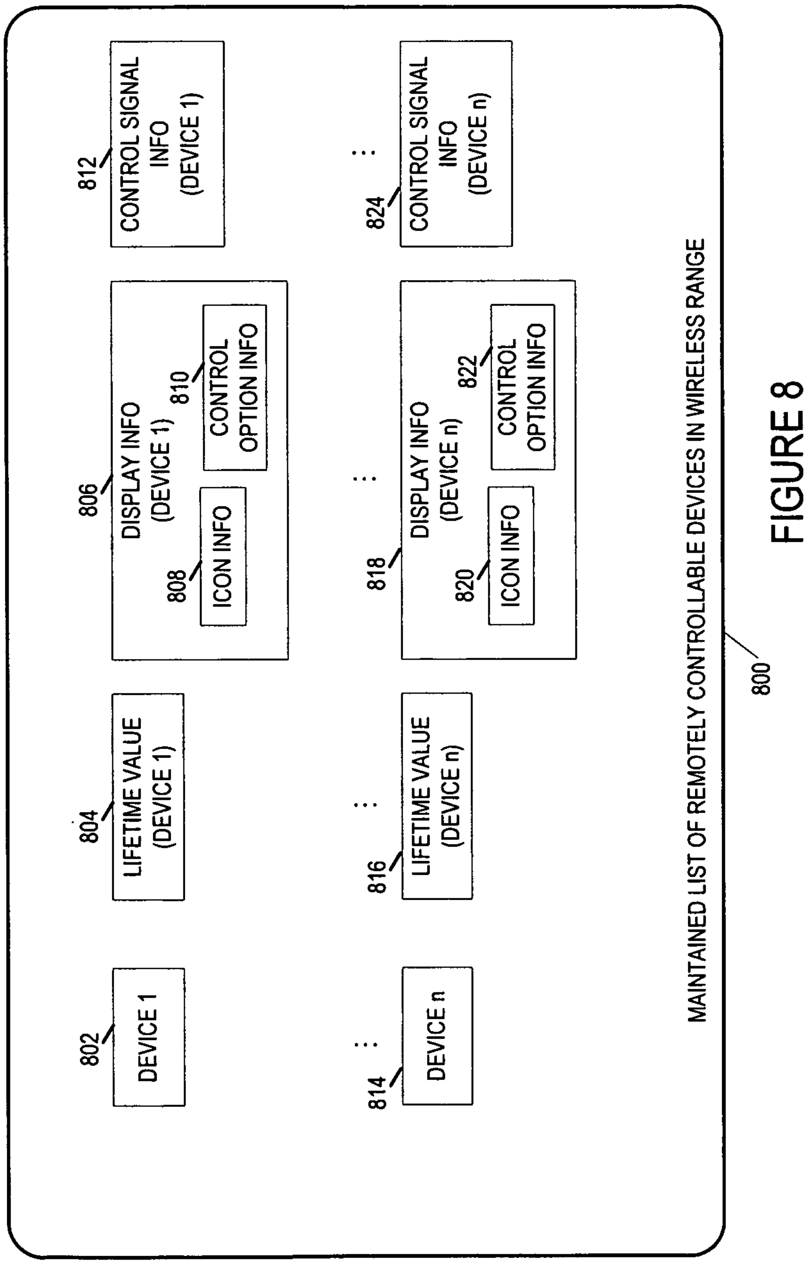
FIG. 8 illustrates an exemplary maintained list of remotely controllable devices in wireless range.

FIG. 8 illustrates an exemplary maintained list of remotely controllable devices in wireless range 800. Exemplary list 800 may be included as part of communications device 502, e.g., the universal remote controller, of FIG. 5. The devices on list 800 change over time based on reception of peer discovery signals. Exemplary list 800 includes a set of information corresponding to each device currently on the list. A first set of information includes a device 1 identifier 802, a lifetime value associated with device 1 804, display information corresponding to device 1 806, and control signal information corresponding to device 1 812. Display information corresponding to device 1 806 includes icon information 808 and control option information 810. An nth set of information includes a device n identifier 814, a lifetime value associated with device n 816, display information corresponding to device n 818, and control signal information corresponding to device n 824. Display information corresponding to device n 818 includes icon information 820 and control option information 822.

FIG. 9 is a table 900 of exemplary stored remote control information corresponding to remotely controllable devices. Exemplary table 900 includes the composite of remote control information that may be included in communications device 502 after the device 502 has resided in local region 1 504 and local region 2 506 as illustrated in FIG. 5. First column 902 illustrates different devices which can be remotely controlled by the communications device 500, second column 904 includes different peer discovery communicated device identifiers, third column 908 includes stored remote control information corresponding to each of the devices which can be remotely controlled, and the fourth column 910 illustrates the source of receiving the remote control information.

Remote control information corresponding to TV 1 has been preloaded in the remote controller 502. Remote control information corresponding to the cable box has been downloaded to communications device 502 through a cellular base station coupled to the cable provider server via a backhaul network and the Internet. Remote control information corresponding to the DVR has been downloaded to communications device 502 through a cellular base station coupled to the digital video recorder manufacturer website via the Internet. Zone 1 lighting controller remote control information has been received by communications device 502 from zone 1 lighting controller 514 via direct peer to peer signaling. Zone 1 temperature controller remote control information has been received by communications device 502 via communications device 502 interfacing with a local PC accessing remote control information from manufacturer supplied media including remote control information, e.g., a CD or DVD including remote control information. Security system remote control information has been loaded by communications device 502 via an interface of communications device 502, e.g. a USB port, from a memory storage including temperature controller manufacturer supplied remote control information. Garage door opener remote control information has been received via direct peer to peer signaling between the garage door opener 520 and communications device 502. Television 2 remote control information has been obtained by a combination of preloaded information in communications device 502 and some user input. Washer/dryer remote control information has been downloaded to communications device 502 through a cellular base station coupled to the washer/dryer manufacturer website via the Internet. Zone 2 temperature controller remote control information has been received via direct peer to peer signal between zone 2 temperature controller 526 and communications device 502. Zone 2 lighting controller remote control information has been received via direct peer to peer signal between zone 2 lighting controller 528 and communications device 502.

Various features of some embodiments will be further described. Consider that a user has a communications device with peer to peer communication capability. The communications device is, e.g., a cell phone with peer to peer capability. In various embodiments, the communications device can also be used as a universal controller for other devices such as television, DVD player, light switch, etc. The universal controller operates in a similar way to a single device remote controller; however, the universal controller provides a virtual user interface which may vary as a function of the device to be controlled so that the user does not need to have multiple physical remote controls, each for a different device. In some embodiments, for at least some devices, the virtual user interface and/or user manual corresponding to the device can be downloaded to the cell phone beforehand, e.g., from the device to be controlled itself or via the Internet.

In some embodiments, a universal controller, e.g., a cell phone with peer to peer communications capability, controls multiple devices. Each of the devices which may be controlled by the universal controller may show up as an icon on the screen of the cell phone so that the user can select one icon when the user intends to use the cell phone to control a corresponding device. To be more user friendly and intelligent, e.g., to avoid overwhelming the screen with many such icons, in some embodiments, the universal controller shows the icons that are in the proximity of the user, but does not show icons corresponding to devices deemed to be away from the user. In some embodiments, the universal controller highlights the icons that are in the proximity of the user, but does not highlight icons corresponding to devices deemed to be away from the user. For example, the intensity level of icons corresponding to remotely controllable devices in the current vicinity of the user can be higher than the intensity level of icons deemed to be away from the user.

In some embodiments, the universal controller uses proximity sensing of peer to peer communications technology to detect whether a device is in the proximity of the user and therefore change the display of icons on the screen accordingly. Several possible methods may be used for proximity sensing. For example, a remotely controllable device may periodically send, e.g., broadcast, an advertisement signal so that the universal controller can detect it. In some embodiments, a recurring peer to peer communications timing structure is used including peer discovery intervals and the advertisement signals are peer discovery signals. Alternatively, the universal controller may send an inquiry signal and wait for a response from the remotely controllable device.

In some embodiments, the universal controller and a remotely controllable device that it is allowed to control may already have been initialized with a certain pairing relationship between the two. In some such embodiments the universal controller display icons corresponding to devices with which it has a pre-existing relationship if it detects a signal from such a device, but the universal controller does not display icons corresponding to foreign devices if it detects a signal from a foreign device. For example, a first universal controller may be paired with a first TV but may not be paired with a second TV. The second TV may be paired with a second universal controller.

The techniques of various embodiments may be implemented using software, hardware and/or a combination of software and hardware. In some embodiments, modules are implemented as physical modules. In some such embodiments, the individual physical modules are implemented in hardware, e.g., as circuits, or include hardware, e.g., circuits, with some software. In other embodiments, the modules are implemented as software modules which are stored in memory and executed by a processor, e.g., general purpose computer. Various embodiments are directed to apparatus, e.g., mobile nodes such as mobile access terminals of which cell phones are but one example, base stations including one or more attachment points, remotely controllable devices, and/or communications systems. Various embodiments are also directed to methods, e.g., method of controlling and/or operating mobile nodes, base stations, remotely controllable devices and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, receiving a wireless signal from a remotely controllable device; adding said remotely controllable device to a list of controllable devices in wireless communications range of said communications device; and enabling control of the remotely controllable device via a user interface on the communications device.

Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

In some embodiments, the processor or processors, e.g., CPUs, of one or more devices, e.g., communications devices such as wireless terminals are configured to perform the steps of the methods described as being as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of operating a communications device, comprising:

receiving a first wireless signal from a remotely controllable device;

adding said remotely controllable device to a list of controllable devices in wireless communications range of said communications device;

initializing a lifetime value for said remotely controllable device;

enabling control of the remotely controllable device via a user interface on the communications device;

determining, based on said lifetime value, whether or not to remove the remotely controllable device from said list, said determining including comparing the lifetime value for said remotely controllable device to a drop threshold; and re-initializing the lifetime value for said remotely controllable device in response to receiving a second wireless signal from said remotely controllable device.

2. The method of claim 1, wherein receiving said first wireless signal from said remotely controllable device includes receiving a peer discovery signal.

3. The method of claim 1, wherein enabling control of the remotely controllable device includes:

displaying user selectable device control options available to the user of said communications device.

4. The method of claim 3, further comprising:

monitoring for user selection of one of said displayed user selectable device control options; and in response to detecting selection of one of said displayed user selectable device control options, transmitting a signal to said remotely controllable device used to control the remotely controllable device to implement the selected option.

5. The method of claim 4, further comprising:

accessing stored information indicating the characteristics of the control signal to be transmitted to control the remotely controllable device to implement the selected option.

6. The method of claim 1, wherein enabling control of the remotely controllable device includes:

displaying a user selectable icon corresponding to the remotely controllable device.

7. The method of claim 1, further comprising:

retrieving from a remote location via a network connection, in response to said received first wireless signal from said remotely controllable device, a set of control information corresponding to said remotely controllable device, said set of control information including control signal information corresponding to said remotely controllable device; and determining from a device identifier communicated by said first received wireless signal which of a plurality of device control options to present to the user of the communications device.

8. A communications device, comprising:

means for receiving a first wireless signal from a remotely controllable device;

means for adding said remotely controllable device to a list of controllable devices in wireless communications range of said communications device;

means for initializing a lifetime value for said remotely controllable device;

means for enabling control of the remotely controllable device via a user interface on the communications device;

means for determining, based on said lifetime value, whether or not to remove the remotely controllable device from said list, said means for determining including means for comparing the lifetime value for said remotely controllable device to a drop threshold; and means for re-initializing the lifetime value for said remotely controllable device in response to receiving a second wireless signal from said remotely controllable device.

9. The communications device of claim 8, wherein said means for receiving said first wireless signal from a remotely controllable device includes means for receiving a peer discovery signal.

10. The communications device of claim 8, wherein said means for enabling control of the remotely controllable device includes:

means for displaying user selectable device control options available to the user of said communications device.

11. The communications device of claim 10, further comprising:

means for monitoring for user selection of one of said displayed user selectable device control options; and means for transmitting a signal to said remotely controllable device used to control the remotely controllable device to implement the selected option, in response to detecting selection of one of said displayed user selectable device control options.

12. The communications device of claim 8, wherein said means for enabling control of the remotely controllable device includes:

means for displaying a user selectable icon corresponding to the remotely controllable device.

13. The communications device of claim 8, further comprising:

means for retrieving from a remote location via a network connection, in response to said received first wireless signal from said remotely controllable device, a set of control information corresponding to said remotely controllable device, said set of control information including control signal information corresponding to said remotely controllable device; and means for determining from a device identifier communicated by said first received wireless signal which of a plurality of device control options to present to the user of the communications device.

14. A computer program product for use in a communications device, the computer program product comprising:

a non-transitory computer readable medium comprising:

code for causing at least one computer to receive a wireless signal from a remotely controllable device;

code for causing said at least one computer to add said remotely controllable device to a list of controllable devices in wireless communications range of said communications device;

code for causing said at least one computer to initialize a lifetime value for said remotely controllable device;

code for causing said at least one computer to enable control of the remotely controllable device via a user interface on the communications device;

code for causing said at least one computer to determine, based on said lifetime value, whether or not to remove the remotely controllable device from said list, said code for causing said at least one computer to determine including code for causing said at least one computer to compare the lifetime value for said remotely controllable device to a drop threshold; and code for causing said at least one computer to re-initialize the lifetime value for said remotely controllable device in response to receiving a second wireless signal from said remotely controllable device.

15. A communications device comprising:

at least one processor configured to:

receive a first wireless signal from a remotely controllable device;

add said remotely controllable device to a list of controllable devices in wireless communications range of said communications device;

initialize a lifetime value for said remotely controllable device;

enable control of the remotely controllable device via a user interface on the communications device;

determine, based on said lifetime value, whether or not to remove the remotely controllable device from said list, said processor being further configured to compare the lifetime value for said remotely controllable device to a drop threshold as part of being configured to determine whether or not to remove the remotely controllable device from said list based; and re-initialize the lifetime value for said remotely controllable device in response to receiving a second wireless signal from said remotely controllable device; and memory coupled to said at least one processor.

16. The communications device of claim 15, wherein said at least one processor is configured to receive a peer discovery signal as part of being configured to receive said first wireless signal from said remotely controllable device.

17. The communications device of claim 15, wherein said at least one processor is configured to display user selectable device control options available to the user of said communications device as part of being configured to enable control of the remotely controllable device.

18. The communications device of claim 17, wherein said at least one processor is further configured to:

monitor for user selection of one of said displayed user selectable device control options; and in response to detecting selection of one of said displayed user selectable device control options, transmit a signal to said remotely controllable device used to control the remotely controllable device to implement the selected option.

19. The communications of claim 15, wherein said at least one processor is configured to display a user selectable icon corresponding to the remotely controllable device as part of being configured to enable control of the remotely controllable device.

* * * * *